United States Patent
Kumazawa et al.

(10) Patent No.: US 6,838,529 B2
(45) Date of Patent: Jan. 4, 2005

(54) POLYESTER COMPOSITION AND CONNECTOR

(75) Inventors: Sadanori Kumazawa, Nagoya (JP); Hiroyuki Ohme, Nagoya (JP); Kenichi Utazaki, Aichi (JP); Jiro Kumaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 140 days.

(21) Appl. No.: 09/988,776

(22) Filed: Nov. 20, 2001

(65) Prior Publication Data

US 2002/0099150 A1 Jul. 25, 2002

(30) Foreign Application Priority Data

Nov. 22, 2000 (JP) ........................................ 2000-356803

(51) Int. Cl.[7] .......................... C08L 67/00; C08L 63/00; C08G 59/68
(52) U.S. Cl. ....................... 525/438; 525/449; 523/401; 524/601; 528/95
(58) Field of Search ................................ 523/401, 440; 525/438, 449; 524/601; 528/95

(56) References Cited

U.S. PATENT DOCUMENTS

| 4,229,553 | A | 10/1980 | Sterzel et al. ............... 525/438 |
| 5,026,790 | A | 6/1991 | Tyrell et al. ................. 525/438 |
| 5,300,546 | A | 4/1994 | Nelson et al. ............... 524/114 |
| 5,596,049 | A | 1/1997 | Gallucci et al. ............. 525/438 |
| 5,731,390 | A | 3/1998 | Helmond ..................... 525/438 |
| 6,214,269 | B1 * | 4/2001 | Fujita et al. ............. 264/176.1 |

FOREIGN PATENT DOCUMENTS

| EP | 0 334 620 A2 | 9/1989 |
| GB | 1093840 | 12/1967 |
| JP | 44-27911 B | 11/1969 |
| JP | 55-23199 A | 2/1980 |
| JP | 57-87452 A | 5/1982 |
| JP | 58-52344 A | 3/1983 |
| JP | 63-47804 B2 | 9/1988 |
| JP | 3-287657 A | 12/1991 |
| JP | 5-222279 A | 8/1993 |
| JP | 5-506055 A | 9/1993 |
| JP | 6-287419 A | 10/1994 |
| JP | 7-47685 B2 | 5/1995 |
| WO | 94/24201 A1 | 10/1994 |

OTHER PUBLICATIONS

Patent Abstracts of Japan, Publication No. 58–052344, Publication Date Mar. 28, 1983.

* cited by examiner

*Primary Examiner*—Tae H. Yoon
(74) *Attorney, Agent, or Firm*—Kubovcik & Kubovcik

(57) ABSTRACT

A polyester composition prepared by melting and blending a polyester with a glycidyl ester compound, a glycidyl ether compound and a catalyst has good hydrolysis resistance and, when melted, gives little gas generation and undergoes little viscosity change. It is most favorable for parts of automobile, electric and electronic appliances such as connectors.

18 Claims, No Drawings

POLYESTER COMPOSITION AND CONNECTOR

BACKGROUND OF THE INVENTION

1. Field of the Invention

The present invention relates to a polyester composition which have improved resistant to hydrolytic degradation and which, when melted, gives little gas emission and undergoes little viscosity change.

2. Description of the Related Art

Polyesters, especially polybutylene terephthalate (hereinunder referred to as PBT) have good moldability, good heat resistance, good mechanical properties and good chemical resistance, and are therefore widely used for various molding materials, for example, for connectors, relays, switches and other parts of automobiles and electric and electronic appliances.

However, PBT is problematic in its hydrolysis resistance. It is considered that the hydrolysis resistance of PBT greatly depends on the carboxyl end group content thereof, and PBT having a reduced carboxyl end group content is desired for realizing increased hydrolysis resistance of itself so that it is usable with no problem even in severe environments, for example, in high-temperature high-humidity atmospheres.

Various methods for the purpose have been investigated. For example, JP-B 27911/1969 discloses a method of adding a phenyl glycidyl ether compound to a polyester; JP-A 87452/1982 discloses a method of adding a monoglycidyl ester compound thereto; and JP-A 52344/1983 discloses a method of adding a glycidyl ester compound and a glycidyl ether compound thereto. However, these methods are all still problematic in that the hydrolysis resistance of the resulting polyesters is not so good and the viscosity in their melts is increased. U.S. Pat. No. 4,229,553, JP-B 47804/1988, JP-A 287657/1991, U.S. Pat. No. 5,026,790, JP-A 287419/1994, JP-A 222279/1993 (U.S. Pat. No. 5,596,049), JP-B 47685/1995 (U.S. Pat. No. 5,300,546) and U.S. Pat. No. 5,731,390 disclose a method of adding an epoxy compound to a polyester and further adding thereto an additive that serves as a catalyst. However, when an epoxy compound is merely combined with a specific catalyst for the additive to a polyester, as in U.S. Pat. No. 4,229,553, JP-B 47804/1988, JP-A 287657/1991, U.S. Pat. No. 5,026,790 and JP-A 287419/1994, it could not still produce satisfactory results. When a single, specific epoxy compound is, combined with a catalyst, added to a polyester, as in JP-A 222279/1993 (U.S. Pat. No. 5,596,049), JP-B 47685/1995 (U.S. Pat. No. 5,300,546) and U.S. Pat. No. 5,731,390, the carboxyl end group content of the resulting polyesters decreases and the hydrolysis resistance thereof therefore increases, but the results are not still satisfactory. In addition, the polyesters disclosed involve another problem in that they give much gas emission when processed or used, and they bleed out when their moldings are hydrolyzed. At present, no one has achieved satisfactory methods for improving polyester.

SUMMARY OF THE INVENTION

The object of the present invention is to provide a polyester composition which is highly resistant to hydrolytic degradation and which, when melted, gives little gas emission and undergoes little viscosity change.

The polyester composition of the invention comprises a melt blended product of (a) a polyester, (b) a glycidyl ester compound, (c) a glycidyl ether compound and (d) a catalyst. This is highly resistant to hydrolysis and, when melted, gives little gas and undergoes little viscosity change.

Preferred embodiments of the invention are mentioned below.

The polyester composition further contains (e) from 1 to 100 parts by weight, relative to 100 parts by weight of the polyester (a), of an impact modifier;

It further contains (f) from 1 to 100 parts by weight, relative to 100 parts by weight of the polyester (a), of a filler;

The carboxyl end group content of the polyester composition is at most 5 equivalents/ton;

The glycidyl ester compound (b) has one glycidyl group in the molecule;

The glycidyl ester compound (b) is any of glycidyl esters of saturated aliphatic monocarboxylic acids or glycidyl esters of aromatic monocarboxylic acids;

The glycidyl ester compound (b) is glycidyl benzoate or glycidyl versatate;

The glycidyl ether compound (c) has one or two glycidyl groups in the molecule;

The glycidyl ether compound (c) is an aromatic glycidyl ether;

The glycidyl ether compound (c) is phenyl glycidyl ether or bisphenol A diglycidyl ether epoxy resin;

The catalyst (d) is an organic, alkali metal or alkaline earth metal salt;

The catalyst (d) is a salt of an organic acid having at least 6 carbon atoms with an alkali metal or an alkaline earth metal;

The catalyst (d) is at least one of sodium stearate, potassium stearate, calcium stearate, magnesium stearate and sodium benzoate;

The polyester (a) is a polymer or copolymer obtained through condensation of essentially a dicarboxylic acid or its ester-forming derivative with 1,4-butanediol, or their mixture.

The invention also provides a method for producing a polyester composition, which comprises melting and blending (a) a polyester with (b) a glycidyl ester compound, (c) a glycidyl ether compound and (d) a catalyst.

The invention further provides a connector made from the polyester composition.

Though not clear, the polyester composition of the invention may attain the good results for the following reasons: A glycidyl ester compound (b) and a glycidyl ether compound (c) that differ in the reactivity with carboxyl end groups of polyester are combined along with a catalyst (d) and added to a polyester (a). Of the resulting polyester composition, therefore, the increase in the carboxyl end group content will be significantly retarded owing to not only the reaction of the combined additives with the carboxyl end groups originally existing in the polyester (a) but also the reaction thereof with the carboxyl end groups additionally formed through hydrolysis of the polyester (a).

DESCRIPTION OF THE PREFERRED EMBODIMENTS

The polyester (a) for use in the invention is a polymer or copolymer obtained through condensation of essentially a dicarboxylic acid (or its ester-forming derivative) with a diol (or its ester-forming derivative), or their mixture.

The dicarboxylic acid component includes, for example, aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, 5-sodium-sulfoisophthalic acid; aliphatic dicarboxylic acids such as adipic acid, sebacic acid, azelaic acid, dodecanedicarboxylic acid; alicyclic dicarboxylic acids such as 1,3-cyclohexanedicarboxylic acid; and their ester-forming derivatives. The diol component includes, for example, aliphatic diols having from 2 to 20 carbon atoms, such as ethylene glycol, propylene glycol, 1,4-butanediol, neopentyl glycol, 1,5-pentanediol, 1,6-hexanediol, decamethylene glycol, cyclohexanedimethanol, cyclohexanediol; long-chain glycols having a molecular weight of from 400 to 6000, such as polyethylene glycol, poly-1,3-propylene glycol, polytetramethylene glycol; and their ester-forming derivatives.

Preferred examples of their polymers and copolymers are polyethylene terephthalate, polypropylene terephthalate, polybutylene terephthalate, polyethylene naphthalate, polybutylene naphthalate, polycyclohexylene-dimethylene terephthalate and polyethylene-1,2-bis (phenoxy)ethane-4,4'-dicarboxylate, as well as polyethylene isophthalate/terephthalate, polybutylene terephthalate/isophthalate, polybutylene terephthalate/adipate, polybutylene terephthalate/sebacate, polybutylene terephthalate/decanedicarboxylate, polyethylene terephthalate/adipate, polyethylene terephthalate/5-sodium-sulfoisophthalate, polybutylene terephthalate/5-sodium-sulfoisophthalate. One or more of these are employable herein. Of those, preferred are polyethylene terephthalate, polypropylene terephthalate, polybutylene terephthalate, polyethylene naphthalate, polybutylene naphthalate, polycyclohexylene-dimethylene terephthalate, polybutylene terephthalate/adipate, polybutylene terephthalate/decanedicarboxylate and polyethylene terephthalate/adipate, in view of the moldability of the polyester composition; and more preferred are polybutylene terephthalate, its copolymers and their mixtures.

Preferably, the polyester (a) has an intrinsic viscosity of from 0.5 to 1.5 dl/g, measured in orthochlorophenol to have a concentration of 0.5% at 25° C.

The glycidyl ester compound (b) for use in the invention is a compound having an esterified glycidyl group, and its examples are glycidyl benzoate, glycidyl p-toluate, glycidyl cyclohexanecarboxylate, glycidyl stearate, glycidyl laurate, glycidyl palmitate, glycidyl versatate, glycidyl oleate, glycidyl linolate, glycidyl linolenate, diglycidyl terephthalate, diglycidyl isophthalate, diglycidyl phthalate, diglycidyl naphthalenedicarboxylate, diglycidyl bibenzoate, diglycidyl methylterephthalate, diglycidyl hexahydrophthalate, diglycidyl tetrahydrophthalate, diglycidyl cyclohexanedicarboxylate, diglycidyl adipate, diglycidyl succinate, diglycidyl sebacate, diglycidyl dodecanedicarboxylate, diglycidyl octadecanedicarboxylate, triglycidyl trimellitate, tetraglycidyl pyromellitate. One or more of these may be used herein. Especially preferred are glycidyl ester compounds having one glycidyl group in the molecule in view of their melt viscosity stability; more preferred are glycidyl esters of saturated aliphatic monocarboxylic acids and glycidyl esters of aromatic monocarboxylic acids; and even more preferred are glycidyl benzoate and glycidyl versatate.

The amount of the glycidyl ester compound (b) to be in the polyester composition preferably falls between 0.1 and 3 parts by weight, more preferably between 0.1 and 2 parts by weight, even more preferably between 0.3 and 1.5 parts by weight, relative to 100 parts by weight of the polyester therein.

The glycidyl ether compound (c) for use in the invention is a compound having an etherified glycidyl group, and its examples are butyl glycidyl ether, stearyl glycidyl ether, allyl glycidyl ether, phenyl glycidyl ether, o-phenylphenyl glycidyl ether, ethyleneoxide lauryl alcohol glycidyl ether, ethyleneoxide phenol glycidyl ether, ethylene glycol diglycidyl ether, polyethylene glycol diglycidyl ether, propylene glycol diglycidyl ether, polypropylene glycol diglycidyl ether, neopentyl glycol diglycidyl ether, polytetramethylene glycol diglycidyl ether, cyclohexanedimethanol diglycidyl ether, glycerol triglycidyl ether, trimethylolpropane triglycidyl ether, pentaerythritol polyglycidyl ether, and bisphenol A diglycidyl ether epoxy resins, bisphenol F diglycidyl ether epoxy resins and bisphenol S diglycidyl ether epoxy resins obtained through condensation of bisphenols such as 2,2-bis-(4-hydroxyphenyl)propane, 2,2-bis(4-hydroxyphenyl) methane, bis(4-hydroxyphenyl) sulfone, with epichlorohydrin. One or more of these may be used herein. Especially preferred are glycidyl ether compounds having one or two glycidyl groups in the molecule in view of their melt viscosity stability; more preferred are aromatic glycidyl ethers; and even more preferred are phenyl glycidyl ether and bisphenol A diglycidyl ether epoxy resins.

The amount of the glycidyl ether compound (c) to be in the polyester composition preferably falls between 0.1 and 5 parts by weight, more preferably between 0.5 and 3 parts by weight, even more preferably between 1.0 and 2.5 parts by weight, relative to 100 parts by weight of the polyester therein.

The catalyst (d) for use in the invention is a compound having the ability to promote the reaction of the glycidyl group with the carboxyl end group of the polyester (a), and its examples are alkali metal compounds such as sodium hydroxide, potassium hydroxide, lithium hydroxide, cesium hydroxide, sodium hydrogen carbonate, potassium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylboron, sodium benzoate, potassium benzoate, lithium benzoate, disodium hydrogenphosphate, dipotassium hydrogenphosphate, dilithium hydrogenphosphate, disodium, dipotassium and dilithium bisphenol A, sodium, potassium, lithium and cesium phenoxide; alkaline earth metal compounds such as calciumhydroxide, bariumhydroxide, magnesium hydroxide, strontium hydroxide, calcium hydrogencarbonate, barium carbonate, magnesium carbonate, strontium carbonate, calcium acetate, barium acetate, magnesium acetate, strontium acetate, calcium stearate, magnesium stearate, strontium stearate; tertiary amines such as triethylamine, tributylamine, trihexylamine, triamylamine, triethanolamine, dimethylaminoethanol, triethylenediamine, dimethylphenylamine, dimethylbenzylamine, 2-(dimethylaminomethyl)phenol, dimethylaniline, pyridine, picoline, 1,8-diazabicyclo(5,4,0)undecene-7; imidazole compounds such as 2-methylimidazole, 2-ethylimidazole, 2-isopropylimidazole, 2-ethyl-4-methylimidazole, 4-phenyl-2-methylimidazole; quaternary ammonium salts such as tetramethylammonium chloride, tetraethylammonium chloride, tetrabutylammonium bromide, trimethylbenzylammonium chloride, triethylbenzylammonium chloride, tripropylbenzylammonium chloride, N-methylpyridinium chloride; phosphine compounds such as trimethylphosphine, triethylphosphine, tributylphosphine, triocytlphosphine; phosphonium salts such as tetramethylphosphonium bromide, tetrabutylphosphonium bromide, tetraphenylphosphonium bromide, ethyltriphenylphosphonium bromide, triphenylbenzylphosphonium bromide; phosphates such as trimethyl phosphate, triethyl phosphate, tributyl phosphate, trioctyl phosphate, tributoxyethyl phosphate, triphenyl phosphate, tricresyl phosphate, trixylenyl phosphate, cresyldiphenyl phosphate, octyldiphenyl phosphate, tri(p-hydroxy)phenyl phosphate, tri(p-methoxy)phenyl phosphate; organic acids such as oxalic acid, p-toluenesulfonic acid, dinonylnaphthalenedisulfonic acid, dodecylbenzenesulfonic acid; Lewis acids such as boron trifluoride, aluminium tetrachloride, titanium tetrachloride, tin tetrachloride. One or more of these may be used herein. Especially preferred are alkali metal compounds, alkaline earth metal compounds and phosphates; and more preferred are salts of organic acids with alkali metals or alkaline earth metals.

Concretely, preferred examples of the compounds are sodium stearate, potassium stearate, calcium stearate, magnesium stearate, sodium benzoate, sodium acetate, potassium acetate, calcium acetate and magnesium acetate. Even more preferred are organic salts having at least 6 carbon atoms of alkali metals or alkaline earth metals, such as sodium stearate, potassium stearate, calcium stearate, magnesium stearate and sodium benzoate and using at least one of the compounds is preferred herein.

The amount of the catalyst (d) to be in the polyester composition is not specifically defined, but preferably falls between 0.001 and 1 part by weight, more preferably between 0.01 and 0.1 parts by weight, even more preferably between 0.03 and 0.1 parts by weight, relative to 100 parts by weight of the polyester therein. If the catalyst amount is smaller than 0.001 parts by weight, the hydrolysis resistance of the polyester composition will be poor; but if larger than 1 part by weight, it will cause side reactions and the deterioration in the physical properties of the composition will be nonnegligible.

An impact modifier (e) may be added to the polyester composition for improving the mechanical strength and other properties of the composition. The impact modifier (e) may be any and every one known for polyester, concretely including natural rubber, polyethylene such as low-density polyethylene and high-density polyethylene, polypropylene, high-impact polystyrene, polybutadiene, styrene-butadiene copolymer, ethylene-propylene copolymer, ethylene-methyl acrylate copolymer, ethylene-ethyl acrylate copolymer, ethylene-vinyl acetate copolymer, ethylene-glycidyl methacrylate copolymer, polyethylene terephthalate-poly(tetramethyleneoxide)glycol block copolymer, and polyethylene terephthalate/isophthalate-poly(tetramethyleneoxide) glycol block copolymer. One or more of these may be used herein.

The amount of the impact modifier (e) to be in the polyester composition may fall between 0.1 and 100 parts by weight, preferably between 1 and 50 parts by weight, relative to 100 parts by weight of the polyester therein.

A filler (f) may also be added to the polyester composition for improving the mechanical strength and other properties of the composition. Its type is not specifically defined, and any of fibrous, tabular, powdery or granular fillers may be used herein. Concretely, it includes fibrous or whisker-like fillers, for example, glass fibers, PAN-derived or pitch-derived carbon fibers, metal fibers such as stainless steel fibers, aluminium fibers and brass fibers, organic fibers such as aromatic polyamide fibers, as well as gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminium borate whiskers, silicon nitride whiskers; and powdery, granular or tabular fillers such as mica, talc, kaolin, silica, calcium carbonate, glass beads, glass flakes, glass microballoons, clay, molybdenum disulfide, wollastonite, montmorillonite, titanium oxide, zinc oxide, calcium polyphosphate, graphite. Of those, especially preferred are glass fibers. Their type is not specifically defined, and any ordinary glass fibers for reinforcing resin are usable herein. For example, the glass fibers for use herein may be selected from chopped strands of long or short glass fibers, and milled fibers thereof. Two or more of the above-mentioned filler substances may be combined for the filler (f) for use herein. If desired, the filler (f) may be processed on its surface with any known coupling agent (e.g., silane coupling agent, titanate coupling agent) or with any other surface-treating agent. The glass fibers for use herein may be coated or bundled with thermoplastic resin such as ethylene-vinyl acetate copolymer or with thermosetting resin such as epoxy resin.

The amount of the filler (f) to be in the polyester composition may fall between 0.1 and 100 parts by weight, preferably between 1 and 50 parts by weight, relative to 100 parts by weight of the polyester therein.

Not interfering with the object of the invention, one or more ordinary additives may be added to the polyester composition of the invention. The additives include, for example, flame retardant, nucleating agent, UV absorbent, thermal stabilizer, lubricant, mold release agent, colorant (e.g., dye, pigment). Limited to a small amount, any other thermoplastic resin (e.g., polyamide, polyacetal, polycarbonate) and thermosetting resin (e.g., phenolic resin, melamine resin, silicone resin) may be added to the polyester composition.

Though not specifically defined, the method for producing the polyester composition of the invention comprises at least a step of melting and kneading the polyester (a) together with the glycidyl ester compound (b), the glycidyl ether compound (c) and the catalyst (d). Preferably, the polyester (a), the glycidyl ester compound (b), the glycidyl ether compound (c), the catalyst (d) and other optional additives are blended in dry, and then blended in melt in an extruder at a temperature not lower than the melting point of the polyester (a); or using an extruder equipped with two supply hoppers, the polyester (a), the glycidyl ester compound (b), the catalyst (d) and other optional additives are fed into the extruder through the main supply hopper disposed just before the screw, while the glycidyl ether compound (c) is thereinto through the side supply hopper disposed between the main supply hopper and the end of the extruder, and they are all melted and blended in the extruder.

The resulting composition may be shaped in any ordinary known method of, for example, injection molding or extrusion.

For the first factor to improve the hydrolysis resistance of the polyester composition of the invention, it is important that the glycidyl ester compound (b) and the glycidyl ether compound (c) which differ in the properties such as the reactivity with the carboxyl end groups of polyester are combined along with the catalyst (d) to thereby reduce the carboxyl end groups originally existing in the polyester (a) through the reaction of (b) and (c) with them. From this viewpoint, it is desirable that the carboxyl end group content of the polyester composition produced in melt is as low as possible, more preferably at most 5 equivalents/ton. For the second factor also to improve the hydrolysis resistance of the polyester composition, it is important to prevent the additional carboxyl end groups of the polyester (a) formed through hydrolysis from increasing by reacting them with the glycidyl compound of the composition. Combining the two factors has led to the present invention. The carboxyl end group content of the polyester composition can be determined in a method of dissolving the polymer in a solvent followed by titrating the resulting polymer solution, or in a method of quantitatively analyzing the polymer through high-resolution NMR.

The polyester composition obtained according to the method of the invention has good hydrolysis resistance and, when melted, gives little gas emission and undergoes little viscosity change. Having such advantages, the polyester composition can be widely used for various molding materials, for example, for automobile parts, and parts of electric and electronic appliances, and it is especially favorable for connectors for automobiles and electric and electronic appliances.

EXAMPLES

The invention is described in more detail with reference to the following Examples. The methods for measuring the properties of the polyester composition of the invention are mentioned below.

(1) Gas Generation

Pellets of the composition are weighed, and left in a hot air drier at 260° C. for 30 minutes. After taken out of the drier, they are again weighed. The weight loss indicates the quantity of gas generation from the sample.

(2) Mechanical Properties

The sample is injection-molded into ASTM #1 dumbbell-shaped test pieces, and they are tested for the tensile yield strength at yield and the tensile strength at break according to ASTM D-638.

(3) Hydrolysis Resistance

The test pieces are left in a pressure cooker tester at 121° C. and 100% RH for 200 hours. After taken out of the tester, they are tested for the tensile strength at yield and the tensile strength at break according to the method (2).

To determine the carboxyl end group content of the sample, the test piece is dissolved in a solvent of o-cresol/chloroform, and the resulting solution is titrated by ethanolic potassium hydroxide.

(4) Melt Viscosity Stability

According to ASTM D-1238, a load of 1 kg is kept applied to the sample at 250° C. in a melt indexer, and the melt flow rate (MFR) of the sample is measured after 5 minutes and 20 minutes.

Examples 1 to 8

Comparative Examples 1 to 11

100 parts by weight of PBT having an intrinsic viscosity of 0.89 dl/g and a carboxyl end group content of 36 eq/ton was blended in dry with a glycidyl ester compound, a glycidyl ether compound, other epoxy compound and a catalyst in the ratio indicated in Table 1 below. The resulting blend was melt blended and pelletized through a 30 -mmφ twin-screw extruder set at 250° C.

Using a screw-in-line injection-molding machine set at 250° C., the resulting pellets were molded into ASTM #1 dumbbell-shaped test pieces. The mold temperature was 80° C.

The data of the gas generation, the melt viscosity stability, the mechanical properties and the hydrolysis resistance of each sample are given in Table 1.

TABLE 1

| | | Composition | | | | | | | Gas | MFR | | Tensile Yield Strength | | | Carboxyl end group Content | |
|---|---|---|---|---|---|---|---|---|---|---|---|---|---|---|---|---|
| | | Glycidyl Ester Compound | | Glycidyl Ether Compound | | Other Epoxy Compound | | Catalyst | | E-mis- | 5 min | 20 min | before pro-cessed | after pro-cessed | reten- | before pro-cessed | after pro-cessed |
| | | type | amount (parts) | type | amount (parts) | type | amount (parts) | type | amount (parts) | sion wt. % | g/10 min | g/10 min | in cook-er MPa | in cook-er MPa | tion % | in cook-er eq/t | in cook-er eq/t |
| Example | 1 | a-1 | 0.3 | b-1 | 2.2 | — | — | d-1 | 0.05 | 0.05 | 26 | 22 | 55 | 52 | 95 | 5 | 21 |
| | 2 | a-2 | 0.5 | b-2 | 2.0 | — | — | d-1 | 0.05 | 0.05 | 29 | 25 | 55 | 53 | 96 | 4 | 19 |
| | 3 | a-2 | 0.5 | b-1 | 2.0 | — | — | d-1 | 0.05 | 0.06 | 31 | 33 | 55 | 52 | 95 | 4 | 20 |
| | 4 | a-2 | 1.0 | b-1 | 1.5 | — | — | d-1 | 0.05 | 0.06 | 32 | 35 | 54 | 50 | 93 | 3 | 18 |
| | 5 | a-2 | 1.5 | b-1 | 1,0 | — | — | d-1 | 0.05 | 0.07 | 31 | 35 | 54 | 49 | 91 | 2 | 21 |
| | 6 | a-2 | 1.5 | b-1 | 1.0 | — | — | d-2 | 0.05 | 0.07 | 31 | 36 | 54 | 48 | 89 | 2 | 28 |
| | 7 | a-3 | 1.0 | b-1 | 1.5 | — | — | d-1 | 0.05 | 0.06 | 31 | 36 | 54 | 50 | 93 | 3 | 20 |
| | 8 | a-2 | 0.7 | b-1 | 1.5 | — | — | d-1 | 0.05 | 0.06 | 31 | 35 | 55 | 43 | 78 | 7 | 36 |
| Comparative Example | 1* | — | — | — | — | — | — | — | — | 0.03 | 30 | 40 | 53 | 10 | 19 | 40 | 450 |
| | 2 | a-2 | 1.0 | — | — | — | — | — | — | 0.06 | 30 | 40 | 53 | 11 | 21 | 14 | 211 |
| | 3 | a-2 | 1.0 | — | — | — | — | d-1 | 0.05 | 0.05 | 30 | 40 | 53 | 12 | 23 | 10 | 170 |
| | 4 | a-2 | 3.0 | — | — | — | — | d-1 | 0.05 | 0.10 | 31 | 40 | 53 | 18 | 34 | 1 | 70 |
| | 5 | — | — | b-1 | 1.5 | — | — | — | — | 0.05 | 30 | 36 | 54 | 13 | 24 | 26 | 277 |
| | 6 | — | — | b-1 | 1.5 | — | — | d-1 | 0.05 | 0.04 | 30 | 27 | 54 | 14 | 26 | 18 | 184 |
| | 7 | — | — | b-1 | 3.0 | — | — | d-1 | 0.05 | 0.06 | 30 | 24 | 55 | 19 | 35 | 10 | 86 |
| | 8 | — | — | — | — | c-1 | 1.5 | d-1 | 0.05 | 0.13 | 30 | 23 | 54 | 18 | 33 | 11 | 96 |
| | 9 | a-2 | 1.0 | b-1 | 1.5 | — | — | — | — | 0.07 | 31 | 39 | 54 | 25 | 46 | 6 | 62 |
| | 10 | a-2 | 1.0 | — | — | c-1 | 1.5 | d-1 | 0.05 | 0.15 | 30 | 35 | 54 | 39 | 72 | 2 | 32 |
| | 11 | — | — | b-1 | 1.0 | c-1 | 1.5 | d-1 | 0.05 | 0.14 | 30 | 20 | 55 | 20 | 36 | 10 | 90 |

Notes in Table 1:
*Not melted and pelletized, this was directly injection-molded.
a-1: diglycidyl terephthalate
a-2: glycidyl benzoate
a-3: glycidyl versatate
b-1: bisphenol A diglycidyl ether epoxy resin
b-2: pentaerythritol polyglycidyl ether
c-1: 3,4-epoxycyclohexylmethyl-3,4-epoxycyclohexylcarboxylate
d-1: sodium stearate
d-2: triphenyl phosphate As is obvious from the data in Table 1, the samples of the polyester composition of the invention all have good hydrolysis resistance, and when melted, give little gas emission and undergo little viscosity change.

Examples 9 to 16

Comparative Examples 12 to 22

Polyester compositions were prepared in the same manner as in Example 1, for which, however, 20 parts by weight of glass fibers and 5 parts by weight of ethylene-ethyl acrylate copolymer were added to 100 parts by weight of PBT having an intrinsic viscosity of 0.82 dl/g and a carboxyl terminal concentration of 40 eq/ton, along with the components indicated in Table 2 below. Each polyester composition thus prepared herein was extruded, molded and tested also in the same manner as in Example 1. The data are given in Table 2.

TABLE 2

| | | Composition | | | | | | | Gas E-mission wt. % | MFR 5 min g/10 min | MFR 20 min g/10 min | Tensile Yield Strength before processed in cooker MPa | Tensile Yield Strength after processed in cooker MPa | retention % | Carboxyl end group Content before processed in cooker eq/t | Carboxyl end group Content after processed in cooker eq/t |
|---|---|---|---|---|---|---|---|---|---|---|---|---|---|---|---|---|
| | | Glycidyl Ester Compound type | Glycidyl Ester Compound amount (parts) | Glycidyl Ether Compound type | Glycidyl Ether Compound amount (parts) | Other Epoxy Compound type | Other Epoxy Compound amount (parts) | Catalyst type | Catalyst amount (parts) | | | | | | | | |
| Example | 9 | a-1 | 0.3 | b-1 | 2.2 | — | — | d-1 | 0.05 | 0.06 | 9 | 7 | 100 | 65 | 65 | 4 | 20 |
| | 10 | a-2 | 0.5 | b-2 | 2.0 | — | — | d-1 | 0.05 | 0.05 | 10 | 6 | 100 | 66 | 66 | 2 | 18 |
| | 11 | a-2 | 0.5 | b-1 | 2.0 | — | — | d-1 | 0.05 | 0.06 | 11 | 12 | 100 | 60 | 60 | 2 | 19 |
| | 12 | a-2 | 1.0 | b-1 | 1.5 | — | — | d-1 | 0.05 | 0.06 | 11 | 13 | 99 | 58 | 59 | 2 | 17 |
| | 13 | a-2 | 1.5 | b-1 | 1.0 | — | — | d-1 | 0.05 | 0.07 | 11 | 14 | 99 | 57 | 58 | 1 | 21 |
| | 14 | a-2 | 1.5 | b-1 | 1.0 | — | — | d-2 | 0.05 | 0.08 | 11 | 13 | 99 | 44 | 44 | 1 | 29 |
| | 15 | a-3 | 1.0 | b-1 | 1.5 | — | — | d-1 | 0.05 | 0.07 | 11 | 13 | 99 | 50 | 51 | 2 | 19 |
| | 16 | a-2 | 0.8 | b-1 | 1.5 | — | — | d-1 | 0.05 | 0.06 | 11 | 13 | 100 | 42 | 42 | 6 | 36 |
| Comparative Example | 12 | — | — | — | — | — | — | — | — | 0.03 | 10 | 13 | 98 | 15 | 15 | 37 | 445 |
| | 13 | a-2 | 1.0 | — | — | — | — | — | — | 0.06 | 10 | 13 | 98 | 16 | 16 | 13 | 205 |
| | 14 | a-2 | 1.0 | — | — | — | — | d-1 | 0.05 | 0.05 | 10 | 13 | 98 | 16 | 16 | 9 | 166 |
| | 15 | a-2 | 3.0 | — | — | — | — | d-1 | 0.05 | 0.10 | 11 | 13 | 98 | 17 | 17 | 0 | 65 |
| | 16 | — | — | b-1 | 1.5 | — | — | — | — | 0.05 | 10 | 12 | 99 | 16 | 16 | 24 | 262 |
| | 17 | — | — | b-1 | 1.5 | — | — | d-1 | 0.05 | 0.04 | 10 | 8 | 99 | 17 | 17 | 17 | 178 |
| | 18 | — | — | b-1 | 3.0 | — | — | d-1 | 0.05 | 0.07 | 10 | 6 | 100 | 20 | 20 | 9 | 85 |
| | 19 | — | — | — | — | c-1 | 1.5 | d-1 | 0.05 | 0.14 | 10 | 6 | 99 | 18 | 18 | 10 | 97 |
| | 20 | a-2 | 1.0 | b-1 | 1.5 | — | — | — | — | 0.07 | 11 | 13 | 99 | 32 | 32 | 4 | 60 |
| | 21 | a-2 | 1.0 | — | — | c-1 | 1.5 | d-1 | 0.05 | 0.15 | 10 | 13 | 99 | 38 | 38 | 1 | 32 |
| | 22 | — | — | b-1 | 1.0 | c-1 | 1.5 | d-1 | 0.05 | 0.14 | 10 | 5 | 100 | 19 | 19 | 10 | 88 |

Notes in Table 2:
a-1: diglycidyl terephthalate
a-2: glycidyl benzoate
a-3: glycidyl versatate
b-1: bisphenol A diglycidyl ether epoxy resin
b-2: pentaerythritol polyglycidyl ether
c-1: 3,4-epoxycyclohexylmethyl-3,4-epoxycyclohexylcarboxylate
d-1: sodium stearate
d-2: triphenyl phosphate As is obvious from the data in Table 2, all the samples of the polyester composition of the invention, though containing glass fibers and ethylene-ethyl acrylate copolymer, still have good hydrolysis resistance, and when melted, give little gas emission and undergo little viscosity change.

What is claimed is:

1. A polyester composition comprising a melt blended product of 100 parts by weight of a polyester (a), 0.1 to 3 parts by weight of a glycidyl ester compound (b), 0.5 to 3 parts by weight of a glycidyl ether compound (c) and 0.001 to 1 part by weight of a catalyst (d), wherein a carboxyl end group content of the polyester (a) in the polyester composition is at most 7 equivalents/ton.

2. The polyester composition as claimed in claim 1 comprising a melt-blended product, which further contains from 1 to 100 parts by weight, relative to 100 parts by weight of the polyester (a), of an impact modifier (e).

3. The polyester composition as claimed in claim 1 comprising a melt-blended product, which contains from 1 to 100 parts by weight, relative to 100 parts by weight of the polyester (a), of a filler (f).

4. The polyester composition as claimed in claim 1, wherein the carboxyl end group content of the polyester (a) in the polyester composition is at most 5 equivalents/ton.

5. The polyester composition as claimed in claim 1, wherein the glycidyl ester compound (b) has one glycidyl group in the molecule.

6. The polyester composition as claimed in claim 1, wherein the glycidyl ester compound (b) is any of glycidyl esters of saturated aliphatic monocarboxylic acids or glycidyl esters of aromatic monocarboxylic acids.

7. The polyester composition as claimed in claim 1, wherein the glycidyl ester compound (b) is glycidyl benzoate or glycidyl versatate.

8. The polyester composition as claimed in claim 1, wherein the glycidyl ether compound (c) has one or two glycidyl groups in the molecule.

9. The polyester composition as claimed in claim 1, wherein the glycidyl ether compound (c) is an aromatic glycidyl ether.

10. The polyester composition as claimed in claim 1, the glycidyl ether compound (c) is phenyl glycidyl ether or bisphenol A diglycidyl ether epoxy resin.

11. The polyester composition as claimed in claim 1, wherein the catalyst (d) is an organic, alkali metal or alkaline earth metal salt.

12. The polyester composition as claimed in claim 1, wherein the catalyst (d) is a salt of an organic acid having at least 6 carbon atoms with an alkali metal or an alkaline earth metal.

13. The polyester composition as claimed in claim 1, wherein the catalyst (d) is at least one of sodium stearate, potassium stearate, calcium stearate, magnesium stearate and sodium benzoate.

14. The polyester composition as claimed in claim 1, wherein the polyester (a) is a polymer or copolymer obtained through condensation of at least one dicarboxylic acid or an ester-forming derivative thereof with 1,4-butanediol, or a mixture of said polymer and copolymer.

15. A method for producing a polyester composition, which comprises melting and blending 100 parts by weight of a polyester (a) with 0.1 to 3 parts by weight of a glycidyl ester compound (b), 0.5 to 3 parts by weight of a glycidyl ether compound (c) and 0.001 to 1 part by weight of a catalyst (d) to provide a carboxyl end group content of the polyester (a) in the polyester composition is at most 7 equivalents/ton.

16. The polyester composition as claimed in claim 2 comprising a melt-blended product, which contains from 1 to 100 parts by weight, relative to 100 parts by weight of the polyester (a), of a filler (f).

17. The polyester composition as claimed in claim 2, wherein the carboxyl end group content of the polyester (a) in the polyester composition is at most 5 equivalents/ton.

18. The polyester composition as claimed in claim 3, wherein the carboxyl end group content of the polyester (a) in the polyester composition is at most 5 equivalents/ton.

\* \* \* \* \*